United States Patent
Matsubayashi et al.

(10) Patent No.: US 9,546,310 B2
(45) Date of Patent: Jan. 17, 2017

(54) METHOD OF MANUFACTURING ANTISTATIC FILM

(71) Applicants: SHIN-ETSU POLYMER CO., LTD., Tokyo (JP); Nissin Chemical Industry Co., Ltd., Echizen-Shi (JP)

(72) Inventors: Sou Matsubayashi, Saitama (JP); Kohei Kanto, Saitama (JP); Kazuyoshi Yoshida, Saitama (JP); Takanori Suzuki, Echizen (JP)

(73) Assignees: Shin-Etsu Polymer Co., Ltd., Tokyo (JP); Nissin Chemical Industry Co., Ltd., Echizen-shi, Fukui-ken (JP)

( * ) Notice: Subject to any disclaimer, the term of this patent is extended or adjusted under 35 U.S.C. 154(b) by 0 days.

(21) Appl. No.: 14/830,454

(22) Filed: Aug. 19, 2015

(65) Prior Publication Data

US 2016/0060497 A1    Mar. 3, 2016

(30) Foreign Application Priority Data

Aug. 27, 2014  (JP) .................. 2014-173203

(51) Int. Cl.
| | | |
|---|---|---|
| C09K 3/16 | (2006.01) | |
| B05D 3/02 | (2006.01) | |
| H01B 1/12 | (2006.01) | |
| B05D 3/12 | (2006.01) | |
| C08J 7/04 | (2006.01) | |
| B29C 71/02 | (2006.01) | |
| B05D 3/00 | (2006.01) | |

(52) U.S. Cl.
CPC ............... *C09K 3/16* (2013.01); *B05D 3/007* (2013.01); *B05D 3/0254* (2013.01); *B05D 3/12* (2013.01); *C08J 7/047* (2013.01); *C08J 7/08* (2013.01); *H01B 1/12* (2013.01); *C08J 2381/06* (2013.01); *C08J 2429/02* (2013.01); *C08J 2429/04* (2013.01); *H01B 1/127* (2013.01)

(58) Field of Classification Search
None
See application file for complete search history.

(56) References Cited

U.S. PATENT DOCUMENTS

| | | | | | |
|---|---|---|---|---|---|
| 5,370,981 | A | * | 12/1994 | Krafft ................... | C08G 61/126 428/403 |
| 5,391,472 | A | * | 2/1995 | Muys ...................... | C09K 3/16 430/496 |
| 5,998,014 | A | * | 12/1999 | Muller .................... | B32B 27/18 428/335 |
| 2006/0202171 | A1 | * | 9/2006 | Yoshida ................. | H01B 1/124 252/500 |
| 2009/0021894 | A1 | * | 1/2009 | Ning ........................ | C09D 5/24 361/527 |
| 2012/0225283 | A1 | * | 9/2012 | Uchimura ................ | G02B 1/04 428/323 |
| 2012/0306114 | A1 | * | 12/2012 | Greco .................... | B82Y 30/00 264/104 |
| 2013/0092878 | A1 | | 4/2013 | Xiao | |
| 2013/0284244 | A1 | * | 10/2013 | Kato ..................... | H01L 51/442 136/252 |

FOREIGN PATENT DOCUMENTS

| | | |
|---|---|---|
| CN | 103694886 A | 4/2014 |
| EP | 2896671 A1 | 7/2015 |
| JP | 3299616 B2 | 7/2002 |
| JP | 2006-282941 A | 10/2006 |
| JP | 2008-045061 A | 2/2008 |
| JP | 2008-179809 A | 8/2008 |
| JP | 2009-176651 A | 8/2009 |
| JP | 2011-038002 A | 2/2011 |
| JP | 2012-194548 A | 10/2012 |
| JP | 2012-248383 A | 12/2012 |
| JP | 2012-252856 A | 12/2012 |
| JP | 2013-239680 A | 11/2013 |
| JP | 2013-249368 A | 12/2013 |
| JP | 2014-152320 A | 8/2014 |
| WO | WO2012/056774 | * 3/2012 |
| WO | 2014125827 A1 | 8/2014 |

OTHER PUBLICATIONS

European Search Report for corresponding EP 15181978.6, dated Feb. 17, 2016.
Japanese Office Action, corresponding JP 2014-173203, dated Oct. 6, 2015.
Chinese Office Action for application 201510520490.2 dated Sep. 30, 2016.

* cited by examiner

*Primary Examiner* — Erma Cameron
(74) *Attorney, Agent, or Firm* — Lando & Anastasi, LLP

(57) ABSTRACT

A method of manufacturing an antistatic film includes a preparation step of preparing a mixed liquid by mixing a polyvinyl alcohol with an aqueous conductive polymer dispersion in which a conductive composite containing a π-conjugated conductive polymer and a polyanion is included in a water-based dispersion medium; a coating step of obtaining a coating film by coating at least one surface of a film base with the mixed liquid; and a drying and stretching step of drying and stretching the coating film with heating.

2 Claims, No Drawings

METHOD OF MANUFACTURING ANTISTATIC FILM

CROSS-REFERENCE TO RELATED APPLICATIONS

This application claims priority to Japanese Patent Application No. 2014-173203, filed Aug. 27, 2014, titled, METHOD OF MANUFACTURING ANTISTATIC FILM, which patent application is hereby incorporated herein by reference in its entirety for all purposes.

BACKGROUND OF THE INVENTION

Field of the Invention

The present invention relates to a method of manufacturing an antistatic film containing a π-conjugated conductive polymer.

Description of Related Art

As films which are used when packing electronic components, antistatic films are widely used to prevent the generation of static electricity which causes the breakdown of the electronic components. Antistatic films may also be used as packaging films for food or the like in order to prevent the appearance of food or the like from being spoiled by dust adhering to the packaging films.

For example, a method of providing an antistatic layer containing a surfactant on at least one surface of a film base is known to provide an antistatic film. However, the antistatic property of the antistatic layer containing a surfactant has a dependence on humidity.

Accordingly, a method of manufacturing an antistatic film is proposed, including providing an antistatic layer containing a π-conjugated conductive polymer and a polyanion on at least one surface of a film base and stretching the film if necessary (Japanese Unexamined Patent Application, First Publication No. 2011-038002 (Patent Document 1), Japanese Unexamined Patent Application, First Publication No. 2006-282941 (Patent Document 2), Japanese Unexamined Patent Application, First Publication No. 2008-179809 (Patent Document 3), and Japanese Patent No. 3299616 (Patent Document 4)).

SUMMARY OF THE INVENTION

However, in the method of manufacturing an antistatic film described in Patent Document 1, the obtained antistatic film may not have a sufficiently high antistatic property. Furthermore, in the method of manufacturing an antistatic film described in Patent Document 1, the productivity of the antistatic film is not sufficient practically.

In the method of manufacturing an antistatic film described in Patent Document 2, when stretching is performed, the π-conjugated conductive polymer cannot follow it, and thus the antistatic film cannot be stably manufactured.

In the method of manufacturing an antistatic film described in Patent Document 3, the sugar alcohol contained in the antistatic layer may precipitate and whiten, or the antistatic property may deteriorate.

In the method of manufacturing an antistatic film described in Patent Document 4, since rubber-like latex having a high insulating property is substantially used as the antistatic layer, the antistatic property may not be sufficiently high.

An object of the invention is to provide a method of manufacturing an antistatic film to stably manufacture an antistatic film having an excellent antistatic property with high productivity.

The invention has the following aspects.

[1] A method of manufacturing an antistatic film including: a preparation step of preparing a mixed liquid by mixing a polyvinyl alcohol with an aqueous conductive polymer dispersion in which a conductive composite containing a π-conjugated conductive polymer and a polyanion is included in a water-based dispersion medium; a coating step of obtaining a coating film by coating at least one surface of a film base with the mixed liquid: and a drying and stretching step of forming an antistatic layer by drying and stretching the coating film with heating.

[2] The method of manufacturing an antistatic film according to [1], in which a water-dispersible resin is further mixed with the aqueous conductive polymer dispersion.

[3] The method of manufacturing an antistatic film according to [1] or [2], in which an amorphous polyethylene terephthalate film is used as the film base.

[4] The method of manufacturing an antistatic film according to [3], in which the dried coating film is heated to 200° C. or higher after the drying and stretching step, and then cooled to a crystallization temperature of the polyethylene terephthalate.

According to the method of manufacturing an antistatic film of the invention, it is possible to stably manufacture an antistatic film having an excellent antistatic property with high productivity.

DETAILED DESCRIPTION OF THE INVENTION

Antistatic Film

An antistatic film which is manufactured using a method of manufacturing an antistatic film of the invention includes a film base and an antistatic layer which is formed on at least one surface of the film base.

Film Base

A plastic film can be used as the film base.

Examples of the resin material constituting the plastic film include polyethylene, polypropylene, polystyrene, polyvinyl chloride, polyvinyl alcohol, polyethylene terephthalate, polybutylene terephthalate, polyethylene naphthalate, polyacrylate, polycarbonate, polyvinylidene fluoride, polyarylate, a styrene-based elastomer, a polyester-based elastomer, polyethersulfone, polyetherimide, polyetheretherketone, polyphenylene sulfide, polyimide, cellulose triacetate and cellulose acetate propionate. Among these resin materials, polyethylene terephthalate is preferred, and amorphous polyethylene terephthalate is more preferred in view of transparency, flexibility, prevention of contamination, strength and the like.

The plastic film may be an unstretched film, a uniaxially stretched film, or a biaxially stretched film. A biaxially stretched film is preferred as the plastic film in view of excellent mechanical properties.

The average thickness of the film base constituting the antistatic film is preferably 5 μm to 400 Lm, and more preferably 10 μm to 200 μm. When the average thickness of the film base constituting the antistatic film is not less than the lower limit value, the film is rarely fractured, and when the average thickness is not greater than the upper limit value, the film can secure sufficient flexibility.

In this specification, the average thickness is a value obtained by measuring thicknesses of ten arbitrary parts and by averaging the measured values.

Antistatic Layer

The antistatic layer includes a conductive composite including a s-conjugated conductive polymer and a polyanion, and polyvinyl alcohol. In the manufacturing method to be described later, the antistatic layer is formed by drying a mixed liquid containing a conductive composite, polyvinyl alcohol, and a water-based dispersion medium and applied to the film base, and by performing stretching.

The average thickness of the antistatic layer constituting the antistatic film is preferably 10 nm to 500 nm, and more preferably 20 nm to 200 nm. When the average thickness of the antistatic layer constituting the antistatic film is not less than the lower limit value, a sufficiently high antistatic property can be exhibited, and when the average thickness is not greater than the upper limit value, the antistatic layer can be easily formed.

Conductive Composite

π-Conjugated Conductive Polymer

The π-conjugated conductive polymer is not particularly limited as long as it is an organic polymer having a main chain composed of a π-conjugated system and has the effects of the invention. Examples thereof include polypyrrole-based conductive polymers, polythiophene-based conductive polymers, polyacetylene-based conductive polymers, polyphenylene-based conductive polymers, polyphenylenevinylene-based conductive polymers, polyaniline-based conductive polymers, polyacene-based conductive polymers, polythiophenevinylene-based conductive polymers, and copolymers thereof. In view of stability in the air, polypyrrole-based conductive polymers, polythiophenes and polyaniline-based conductive polymers are preferred, and polythiophene-based conductive polymers are more preferred in view of transparency.

Examples of the polythiophene-based conductive polymers include polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromiothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butylenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), and poly(3-methyl-4-carboxybutylthiophene).

Examples of the polypyrrole-based conductive polymers include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-miethyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), and poly(3-methyl-4-hexyloxypyrrole).

Examples of the polyaniline-based conductive polymers include polyaniline, poly(2-methylaniline), poly(3-isobutylaniline), poly(2-aniline sulfonic acid), and poly(3-aniline sulfonic acid).

Among the π-conjugated conductive polymers, poly(3,4-ethylenedioxythiophene) is particularly preferred in view of a conductive property, transparency, and heat resistance.

The π-conjugated conductive polymers may be used singly or in combination of two or more kinds.

Polyanion

The polyanion is a polymer having two or more monomer units having an anion group in a molecule. The anion group of the polyanion functions as a dopant with respect to the π-conjugated conductive polymer to improve the conductive property of the π-conjugated conductive polymer.

A sulfo group or a carboxy group is preferred as the anion group of the polyanion.

Specific examples of the polyanion include polymers having a sulfonic acid group such as polystyrene sulfonic acid, polyvinyl sulfonic acid, polyallyl sulfonic acid, polyacrylic sulfonic acid, polymethacrylic sulfonic acid, poly(2-acrylamide-2-methylpropane sulfonic acid), polyisoprene sulfonic acid, polysulfoethyl methacrylate, poly(4-sulfobutyl methacrylate), and polymethacryloxybenzene sulfonic acid, and polymers having a carboxylic acid group such as polyvinyl carboxylic acid, polystyrene carboxylic acid, polyallyl carboxylic acid, polyacrylic carboxylic acid, polymethacrylic carboxylic acid, poly(2-acrylamide-2-methylpropane carboxylic acid), polyisoprene carboxylic acid, and polyacrylic acid. These homopolymers may be used or copolymers of two or more kinds may be used.

Among these polyanions, a polymer having a sulfonic acid group is preferred, and a polystyrene sulfonic acid is more preferred since the antistatic property can be further increased.

The polyanions may be used singly or in combination of two or more kinds.

The mass-average molecular weight of the polyanion is preferably 20,000 to 1,000,000, and more preferably 100,000 to 500,000.

In this specification, the mass-average molecular weight is a value obtained through measurement by gel permeation chromatography using polystyrene as a standard substance.

The content ratio of the polyanion in the conductive composite is preferably 1 part by mass to 1000 parts by mass, more preferably 10 part by mass to 700 parts by mass, and even more preferably 100 parts by mass to 500 parts by mass with respect to 100 parts by mass of the π-conjugated conductive polymer. When the content ratio of the polyanion is less than the lower limit value, there is a tendency that the doping effect on the π-conjugated conductive polymer may deteriorate and the conductive property is insufficient. In addition, the water dispersibility of the conductive composite is lowered. When the content of the polyanion is greater than the upper limit value, the content of the π-conjugated conductive polymer is reduced and it is difficult to obtain a sufficient conductive property.

The conductive composite is formed by coordination of the polyanion to the π-conjugated conductive polymer.

In the polyanion, not all of the anion groups are doped to the π-conjugated conductive polymer and surplus anion groups are included. Since the surplus anion groups are hydrophilic groups, the conductive composite has water dispersibility.

Binder Resin

The antistatic layer may contain a binder resin other than the conductive composite and the polyvinyl alcohol. The binder resin is a resin other than the π-conjugated conductive polymer, the polyanion, and the polyvinyl alcohol and is a resin which binds the π-conjugated conductive polymer and the polyanion to increase the coating film strength.

In the invention, as the binder resin, a material having water dispersibility is used.

Specific examples of the binder resin include acrylic resin, polyester resin, polyurethane resin, polyimide resin, polyether resin, and melamine resin.

Alkaline Compound

The antistatic layer may contain an alkaline compound. When the antistatic layer contains the alkaline compound, whitening of the antistatic layer can be suppressed.

Examples of the alkaline compound which may be contained in the antistatic layer include an inorganic alkali, an amine compound, a quaternary ammonium salt, and a nitrogen-containing aromatic cyclic compound.

Examples of the inorganic alkali include sodium hydroxide, potassium hydroxide, calcium hydroxide, ammonia, sodium bicarbonate, potassium bicarbonate, and ammonium bicarbonate.

Examples of the amine compound include aniline, toluidine, benzylamine, ethanolamine, diethanolamine, dimethylamine, diethylamine, dipropylamine, triethanolamine, trimethylamine, triethylamine, and tripropylamine.

Examples of the quaternary ammonium salt include tetramethylammonium salt, tetraethylammonium salt, tetrapropylammonium salt, tetraphenylammonium salt, tetrabenzylammonium salt, tetranaphthylammonium salt, and 1-ethyl-3-methylimidazolium hydroxide.

Examples of the nitrogen-containing aromatic cyclic compound include imidazole, 2-methylimidazole, 2-propylimidazole, 1-(2-hydroxyethyl)imidazole, 2-ethyl-4-methylimidazole, 1,2-dimethylimidazole, 1-cyanoethyl-2-methylimidazole, 1-cyanoethyl-2-ethyl-4-methylimidazole, 2-aminobenzimidazole, and pyridine.

The alkaline compounds may be used singly or in combination of two or more kinds.

Hydroxy Group-Containing Compound

The antistatic layer may contain a hydroxy group-containing compound having three or more hydroxy groups. When the antistatic layer contains the hydroxy group-containing compound, the antistatic property can be further improved. The antistatic property improvement effect cannot be sufficiently obtained when the antistatic layer contains a hydroxyl group-containing compound having not more than two hydroxy groups.

Examples of the hydroxy group-containing compound include a sugar alcohol compound and an aromatic hydroxy group-containing compound having three or more hydroxy groups bonded to an aromatic ring. The hydroxy group-containing compound is not a polymer.

Examples of the sugar alcohol compound include sorbitol (melting point: 95° C.), xylitol (melting point: 92° C. to 96° C.), maltitol (melting point: 145° C.), erythritol (melting point: 121° C.), mannitol (melting point: 166° C. to 168° C.), inositol (melting point: 225° C. to 227° C.), and lactitol (melting point: 150° C.).

Examples of the aromatic hydroxy group-containing compound include pyrogallol (melting point: 131° C. to 134° C.), gallic acid (melting point: 250° C.), and propyl gallate (melting point: 150° C.).

The hydroxy group-containing compounds may be used singly or in combination of two or more kinds.

The melting point of the hydroxy group-containing compound is preferably 150° C. or lower, more preferably 135° C. or lower, and even more preferably 100° C. or lower. When the melting point of the hydroxy group-containing compound is not higher than the upper limit value, the antistatic property of the antistatic layer is further improved. The melting point of the hydroxy group-containing compound is preferably 50° C. or higher.

The melting point of the hydroxy group-containing compound can be obtained by differential scanning calorimetry (DSC).

Additives

The antistatic layer may contain known additives.

The additives are not particularly limited as long as they have the effects of the invention. For example, a surfactant, an inorganic conductive agent, an antifoaming agent, a coupling agent, an antioxidant, an ultraviolet absorber and the like can be used. The additive is formed of a compound other than the polyanion, the alkaline compound and the hydroxy group-containing compound.

Examples of the surfactant include nonionic surfactants, anionic surfactants, and cationic surfactants. Nonionic surfactants are preferred in view of storage stability. In addition, polymer-based surfactants may also be added such as polyvinyl alcohol or polyvinylpyrrolidone.

Examples of the inorganic conductive agent include metal ions and conductive carbon. Furthermore, metal ions can be formed by dissolving a metal salt in water.

Examples of the antifoaming agent include a silicone resin and polydimethylsiloxane.

Examples of the coupling agent include silane coupling agents having a vinyl group, amino group, epoxy group or the like.

Examples of the antioxidant include phenol-based antioxidants, amine-based antioxidants, phosphorous-based antioxidants, sulfur-based antioxidants, sugars, and vitamins.

Examples of the ultraviolet absorber include benzotriazole-based ultraviolet absorbers, benzophenone-based ultraviolet absorbers, salicylate-based ultraviolet absorbers, cyanoacrylate-based ultraviolet absorbers, oxanilide-based ultraviolet absorbers, hindered amine-based ultraviolet absorbers, and benzoate-based ultraviolet absorbers.

Method of Manufacturing Antistatic Film

The method of manufacturing an antistatic film of the invention has a preparation step, a coating step, and a drying and stretching step.

Preparation Step

The preparation step is a step of preparing a mixed liquid by mixing a polyvinyl alcohol, and if desired, a water-dispersible resin with an aqueous conductive polymer dispersion.

Here, the aqueous conductive polymer dispersion is a dispersion in which a conductive composite containing a π-conjugated conductive polymer and a polyanion is contained in a water-based dispersion medium.

In the preparation step, the hydroxy group-containing compound may be added to the aqueous conductive polymer dispersion in order to further improve the antistatic property of the antistatic film. In the preparation step, the alkaline compound may be added to the aqueous conductive polymer dispersion in order to suppress whitening of the antistatic layer. Furthermore, the additives may be added to the aqueous conductive polymer dispersion.

When the alkaline compound is added, it is added in such an amount that the pH (25° C.) of the mixed liquid is preferably 3 to 10, and more preferably 5 to 9. When the pH of the mixed liquid is within the above-described range, the antistatic property of the antistatic layer is improved, and thus whitening can be further suppressed.

Water-Based Dispersion Medium

The water-based dispersion medium is water or a mixture of water and a water-soluble organic solvent. The content ratio of the water in the water-based dispersion medium is preferably 50% by mass or greater, and more preferably 80% by mass or greater. The content ratio of the water in the water-based dispersion medium is preferably 95% by mass or less. That is, the content ratio of the water in the water-based dispersion medium is preferably 50% by mass to 95% by mass, and more preferably 80% by mass to 95% by mass.

Examples of the water-soluble organic solvent include solvents having a solubility parameter of 10 or greater such as monohydric alcohol solvents, nitrogen atom-containing polar solvents, phenol solvents, polyhydric aliphatic alcohol solvents, carbonate solvents, ether solvents, heterocyclic compounds, and nitrile compounds.

Examples of the monohydric alcohol solvents include methanol, ethanol, and isopropanol.

Examples of the nitrogen atom-containing polar solvents include N-methyl-2-pyrrolidone, N-methylacetoamide, N,N-dimethylformamide, N,N-dimethylacetoamide, dimethylsulfoxide, hexamethylenephosphortriamide, N-vinylpyrrolidone, N-vinylformamide, and N-vinylacetoamide. Nitrile compounds are not included in the nitrogen atom-containing polar solvents.

Examples of the phenol solvents include cresol, phenol, and xylenol.

Examples of the polyhydric aliphatic alcohol solvents include ethylene glycol, propylene glycol, dipropylene glycol, 1,3-butylene glycol, isoprene glycol, 1,4-butanediol, 1,5-pentanediol, 1,6-hexanediol, 1,9-nonanediol, and neopentyl glycol.

Examples of the carbonate solvents include ethylene carbonate and propylene carbonate.

Examples of the ether solvents include dioxane, diethyl ether, propylene glycol dialkyl ether, polyethylene glycol dialkyl ether, and polypropylene glycol dialkyl ether.

Examples of the heterocyclic compounds include 3-methyl-2-oxazolidinone.

Examples of the nitrile compounds include acetonitrile, glutaronitrile, methoxyacetonitrile, propionitrile, and benzonitrile.

These solvents may be used singly or as a mixture of two or more kinds. Among these, at least one selected from the group consisting of methanol, ethanol, isopropanol, and dimethylsulfoxide is preferred from the viewpoint of stability.

Polyvinyl Alcohol

The polyvinyl alcohol functions as a dispersing agent for the conductive composite and the water-dispersible resin. When the mixed liquid contains the polyvinyl alcohol, stretchability is increased when the coating film is stretched in the drying and stretching step.

The polyvinyl alcohol is manufactured through saponification of the acetyl group of polyvinyl acetate, but some acetyl groups may not be saponified. Therefore, the polyvinyl alcohol may include a vinyl acetate unit. The saponification degree of the polyvinyl alcohol used in the invention is preferably 70% to 100%. When the saponification degree of the polyvinyl alcohol is not less than the lower limit value, simple dissolution in water is possible.

The mass-average molecular weight of the polyvinyl alcohol is preferably 1,000 to 100,000, and more preferably 1,300 to 60,000. When the mass-average molecular weight of the polyvinyl alcohol is not less than the lower limit value, the stretchability of the coating film to be described later can be sufficiently improved. When the mass-average molecular weight is not greater than the upper limit value, the solubility in water can be improved.

Water-Dispersible Resin

The water-dispersible resin is a resin which can be dispersed in the aqueous conductive polymer dispersion, and becomes a binder resin in the antistatic layer.

Specific examples of the water-dispersible resin include hydrophilic resins such as acrylic resin, polyester resin, polyurethane resin, polyimide resin, and melamine resin having an acid group such as a carboxy group or a sulfo group or a salt thereof.

Other specific examples of the water-dispersible resin include acrylic resin, polyester resin, polyurethane resin, polyimide resin, and melamine resin having an emulsion form.

Among these, a polyester resin having an acid group or a salt thereof, a polyurethane resin having an acid group or a salt thereof, an emulsion-like polyester resin, and an emulsion-like polyurethane resin are preferred as the water-dispersible resin from the viewpoint that the antistatic property can be further increased.

The water-dispersible resins may be used singly or in combination of two or more kinds.

The glass transition temperature of the water-dispersible resin is preferably 0° C. or higher in view of properties of the antistatic layer. The glass transition temperature can be obtained through differential scanning calorimetry (DSC).

A polyether resin such as polyethylene glycol or polyalkylene oxide is a resin having water dispersibility. However, it is not preferred since whitening and a deterioration in the antistatic property are caused.

Accordingly, it is preferable that the polyether resin not be used as the water-dispersible resin and not be included in the antistatic layer.

Content Ratio

The content ratio of the polyvinyl alcohol in the mixed liquid is preferably 0.01% by mass to 10% by mass, and more preferably 0.1% by mass to 5% by mass with respect to 100% by mass of the total mass of the mixed liquid. When the content ratio of the polyvinyl alcohol is not less than the lower limit value, the stretchability of the coating film can be further increased. When the content ratio is not greater than the upper limit value, the deterioration in the antistatic property can be suppressed.

The content ratio of the water-based dispersion medium in the mixed liquid is preferably 50% by mass to 90% by mass, and more preferably 70% by mass to 90% by mass with respect to 100% by mass of the total mass of the mixed liquid. When the content ratio of the water-based dispersion medium is not less than the lower limit value, the respective components are easily dispersed, and thus coatability can be improved. When the content ratio is not greater than the upper limit value, the solid content concentration is increased, and thus the thickness can be easily secured through one coating operation.

When the water-dispersible resin is added to the aqueous conductive polymer dispersion and the mixed liquid thus contains the water-dispersible resin, the content ratio of the water-dispersible resin in the mixed liquid is preferably 100 parts by mass to 10.000 parts by mass, more preferably 100 parts by mass to 5,000 parts by mass, and even more preferably 100 parts by mass to 1.000 parts by mass with respect to 100 parts by mass of the solid content of the conductive composite. When the content ratio of the water-dispersible resin is not less than the lower limit value, the film-forming property and the film strength can be improved. However, when the content ratio of the water-dispersible resin is greater than the upper limit value, the content ratio of the conductive composite is reduced, and thus the antistatic property may deteriorate.

When the hydroxy group-containing compound is added to the aqueous conductive polymer dispersion and the mixed liquid thus contains the hydroxy group-containing compound, the content ratio of the hydroxy group-containing compound in the mixed liquid is preferably 10 parts by mass to 1,000 parts by mass, more preferably 10 parts by mass to 500 parts by mass, and even more preferably 10 parts by mass to 200 parts by mass with respect to 100 parts by mass of the solid content of the conductive composite. When the content ratio of the hydroxy group-containing compound is not less than the lower limit value, the antistatic property can be further improved. However, when the content ratio of the hydroxy group-containing compound is greater than the upper limit value, the content ratio of the conductive composite is reduced, and thus the antistatic property may deteriorate.

When the additives are added to the aqueous conductive polymer dispersion and the mixed liquid thus contains the additives, the content ratio of the additives in the mixed liquid is generally 0.001 parts by mass to 5 parts by mass with respect to 100 parts by mass of the solid content of the conductive composite although it is appropriately determined according to the kind of the additives.

High Dispersion Treatment

A high dispersion treatment may be performed to improve the dispersibility of the conductive composite in the water-based dispersion medium by applying a shear force to the aqueous conductive polymer dispersion.

In the high dispersion treatment, a dispersing machine is preferably used. Examples of the dispersing machine include a homogenizer, a high-pressure homogenizer, and a bead mill. Among these, a high-pressure homogenizer is preferred.

The high-pressure homogenizer is, for example, a device having a high-pressure generation portion which applies a pressure to an aqueous conductive polymer dispersion or the like to be subjected to the high dispersion treatment, and a counter collision portion, orifice portion or slit portion which performs dispersion. As the high-pressure generation portion, a high-pressure pump such as a plunger pump is preferably used.

There are various forms of high-pressure pumps such as single types, double types, and triple types, and in the invention, any form can be employed.

Specific examples of the high-pressure homogenizer include Nanomizer (product name) manufactured by Yoshida Kikai Co., Ltd. Microfluidizer (product name) manufactured by Microfluidics, and Ultimizer manufactured by Sugino Machine Ltd.

Mixing of Polyvinyl Alcohol and Water-Dispersible Resin

When mixing the polyvinyl alcohol, a mixed liquid is preferably obtained by mixing the polyvinyl alcohol with the aqueous conductive polymer dispersion subjected to the high dispersion treatment. When mixing the polyvinyl alcohol, stirring is preferably performed during or after the addition of the polyvinyl alcohol to the aqueous conductive polymer dispersion subjected to the high dispersion treatment.

When mixing the water-dispersible resin, a mixed liquid is preferably obtained by mixing the water-dispersible resin with the aqueous conductive polymer dispersion subjected to the high dispersion treatment. When mixing the water-dispersible resin, stirring is preferably performed during or after the addition of the water-dispersible resin to the aqueous conductive polymer dispersion subjected to the high dispersion treatment.

The water-dispersible resin may be mixed with the aqueous conductive polymer dispersion while taking a solid form or a form of an aqueous solution or an aqueous dispersion (slurry or emulsion).

Coating Step

The coating step is a step of obtaining a coating film by applying the mixed liquid to at least one surface of the film base.

The average thickness of the film base to be subjected to coating with the mixed liquid, that is, the average thickness of the film base before stretching is preferably 10 μm to 500 μm, and more preferably 20 μm to 200 μm. When the average thickness of the film base is not less than the lower limit value, the film is rarely fractured, and when the average thickness is not greater than the upper limit value, the film can secure sufficient flexibility.

As the method of coating with the mixed liquid, a coating method using a coater such as a gravure coater, a roll coater, a curtain flow coater, a spin coater, a bar coater, a reverse coater, a kiss coater, a fountain coater, a rod coater, an air doctor coater, a knife coater, a blade coater, a cast coater, or a screen coater, a spraying method using a spray such as an air spray, an airless spray, or a rotor dampening, or a soaking method such as dipping can be used.

Among the above-described methods, using a bar coater may be applied for easy coating. The coating thickness varies with the kind of the bar coater and commercially available coaters have a number assigned for each kind. The larger the number, the thicker the coating.

The amount of the mixed liquid to be applied to the base is not particularly limited, and is preferably 0.1 $g/m^2$ to 2.0 $g/m^2$ in terms of solid content.

Drying and Stretching Step

The drying and stretching step is a step of drying and stretching the coating film with heating. The antistatic layer can be formed by drying and stretching the applied mixed liquid. In addition, by stretching the coating film, an antistatic film having a large area can be obtained even when the coating area is small, and thus the productivity of the antistatic film can be improved.

In the drying and stretching step, the heating temperature of the coating film is preferably not lower than the boiling point of the water-based dispersion medium. The heating temperature of the coating film is preferably 200° C. or lower, and more preferably 180° C. or lower. That is, the heating temperature of the coating film is preferably the boiling point of the water-based dispersion medium to 200° C., and more preferably the boiling point of the water-based dispersion medium to 180° C.

As the method of heating the coating film, a general method such as hot air heating and infrared heating can be employed.

In the drying and stretching step, at least a part of the polyvinyl alcohol may be decomposed and may disappear. When the water-dispersible resin is not used, the heating temperature is preferably adjusted to suppress the decomposition of the polyvinyl alcohol. Specifically, the heating temperature is preferably the boiling point of the water-based dispersion medium to 150° C.

The average thickness of the dried coating film of the mixed liquid before stretching is preferably 20 nm to 1,000 nm, and more preferably 40 nm to 400 nm. When the average thickness of the dried coating film of the mixed liquid before stretching is not less than the lower limit value, a sufficiently high antistatic property can be exhibited, and when the average thickness is not greater than the upper limit value, the antistatic layer can be easily formed.

In the drying and stretching step, the coating film may be stretched simultaneously with or after drying. When the stretching is performed simultaneously with or after drying, the film base can be softened using the heat for drying applied to the coating film. Therefore, the efficiency of energy usage for obtaining the antistatic film can be increased.

When a uniaxially stretched film is used as the film base, the stretching is preferably performed in a direction perpendicular to the stretching direction. For example, when a uniaxially stretched film stretched in a longitudinal direction is used as the film base, the stretching is preferably performed in a width direction.

The stretching magnification of the coating film is preferably 2 to 5. When the stretching magnification is not less than the lower limit value, the productivity of the antistatic film can be further increased, and when the stretching magnification is not greater than the upper limit value, the fracturing of the film can be prevented.

Crystallization Step

When an amorphous polyethylene terephthalate film is used as the film base, a crystallization step may be provided after the drying and stretching step.

In the crystallization step, the dried coating film is heated so that the surface temperature thereof is increased to 200° C. or higher. Then, the film is cooled to a temperature of less than the crystallization temperature of the polyethylene terephthalate.

When the heating is performed so that the surface temperature is increased to 200° C. or higher, melting of at least a part of the amorphous polyethylene terephthalate constituting the film base starts. After the melting, when cooling is performed so that the surface temperature is reduced to a temperature of less than the crystallization temperature of the polyethylene terephthalate, the melted part of the amorphous polyethylene terephthalate is crystallized and solidified. Accordingly, a crystalline polyethylene terephthalate film can be used as the film base. The film base formed of the crystalline polyethylene terephthalate film is excellent in mechanical properties such as tensile strength.

Effects

In the method of manufacturing an antistatic film, since a π-conjugated conductive polymer is used as the conductive component which contributes to prevention of static charge, the antistatic property is rarely affected by humidity and the like.

In the manufacturing method, when the mixed liquid to be applied to the film base contains a polyvinyl alcohol, the antistatic property of the antistatic film to be obtained can be sufficiently improved. Furthermore, when the mixed liquid to be applied to the film base contains a polyvinyl alcohol, the stretchability of the coating film can be improved. Accordingly, in the manufacturing method, an antistatic film having a larger area than the coating area can be easily manufactured, and excellent productivity and excellent production stability are obtained.

In addition, in the method of manufacturing an antistatic film having the above-described steps, a film base can be produced by extrusion molding, continuous coating with the mixed liquid can be performed while the produced film base is scanned, and drying by heating and stretching can be performed following the continuous coating. Otherwise, in the method of manufacturing an antistatic film having the above-described steps, a film base can be drawn out from a roll-like film base, continuous coating with the mixed liquid can be performed while the drawn-out film base is scanned, and drying by heating and stretching can be performed following the continuous coating. That is, in the manufacturing method, antistatic films can be continuously manufactured from the film base. When continuous manufacturing is performed, the productivity of the antistatic film can be further increased.

Preferable Aspects (a) A preferable aspect of a method of manufacturing an antistatic film of the invention includes: a preparation step of preparing a mixed liquid by mixing a polyvinyl alcohol with an aqueous conductive polymer dispersion in which a conductive composite containing a polythiophene-based conductive polymer and a polyanion having a sulfo group is included in a water-based dispersion medium;

a coating step of obtaining a coating film by coating at least one surface of a film base with the mixed liquid; and a drying and stretching step of forming an antistatic layer by drying and stretching the coating film with heating.

(b) A more preferable aspect of a method of manufacturing an antistatic film of the invention includes: a preparation step of preparing a mixed liquid by mixing a polyvinyl alcohol and a water-dispersible resin with an aqueous conductive polymer dispersion in which a conductive composite containing a polythiophene-based conductive polymer and a polyanion having a sulfo group is included in a water-based dispersion medium:

a coating step of obtaining a coating film by coating at least one surface of a film base with the mixed liquid; and a drying and stretching step of forming an antistatic layer by drying and stretching the coating film with heating, and one or more selected from the group consisting of polyester, polyurethane, and polyester-polyurethane is used as the water-dispersible resin.

(c) An even more preferable aspect of a method of manufacturing an antistatic film of the invention includes: a preparation step of preparing a mixed liquid having a pH of 5 to 9 at 25° C. by mixing a polyvinyl alcohol, a water-dispersible resin, and an alkaline compound with an aqueous conductive polymer dispersion in which a conductive composite containing poly(3,4-ethylenedioxythiophene) and a polystyrene sulfonic acid is included in water, a coating step of obtaining a coating film by coating at least one surface of a film base with the mixed liquid; and a drying and stretching step of forming an antistatic layer by drying the coating film with heating to 100° C. to 180° C. and stretching the coating film by 2 to 5 times.

EXAMPLES

Preparation Example 1

Preparation of Polystyrene Sulfonic Acid 206 g of sodium styrenesulfonate was dissolved in 1,000 ml of ion-exchanged water. While the resulting solution was stirred at 80° C., 1.14 g of a solution of an ammonium persulfate oxidant previously dissolved in 10 ml of water was added dropwise for 20 minutes, and this solution was stirred for 12 hours.

1,000 ml of a sulfuric acid diluted to 10% by mass was added to the obtained sodium styrenesulfonate-containing solution, approximately 1,000 ml of the polystyrene sulfonic acid-containing solution was removed through ultrafiltration, 2,000 ml of ion-exchanged water was added to the remaining solution, and approximately 2,000 ml of the solution was removed through ultrafiltration. The above-described ultrafiltration operation was repeated three times.

Approximately 2,000 ml of ion-exchanged water was added to the obtained solution, and approximately 2,000 ml of the solution was removed through ultrafiltration. This ultrafiltration operation was repeated three times.

The water in the obtained solution was removed under reduced pressure, and thus a solid material of the polystyrene sulfonic acid having no color was obtained.

Preparation Example 2

Preparation of Aqueous Dispersion of Poly(3,4-Ethylenedioxythiophene)-Polystyrene Sulfonate (PEDOT-PSS)

14.2 g of 3,4-ethylenedioxythiophene and a solution obtained by dissolving 36.7 g of a polystyrene sulfonic acid in 2,000 ml of ion-exchanged water were mixed at 20° C.

While the mixed solution obtained as above was kept at 20° C. and stirred, 29.64 g of ammonium persulfate dissolved in 200 ml of ion-exchanged water and 8.0 g of a ferric sulfate oxidation catalyst solution were slowly added thereto and stirred for 3 hours for reaction.

2,000 ml of ion-exchanged water was added to the obtained reaction liquid, and approximately 2,000 ml of the solution was removed through ultrafiltration. This operation was repeated three times.

200 ml of a sulfuric acid diluted to 10% by mass and 2,000 ml of ion-exchanged water were added to the obtained solution, approximately 2,000 ml of the solution was removed through ultrafiltration, 2,000 ml of ion-exchanged water was added thereto, and approximately 2,000 ml of the liquid was removed through ultrafiltration. This operation was repeated three times.

2,000 ml of ion-exchanged water was added to the obtained solution, and approximately 2,000 ml of the solution was removed through ultrafiltration. This operation was repeated five times to obtain an aqueous dispersion of blue PEDOT-PSS of approximately 1.2% by mass.

Manufacturing Example 1

30 g of the aqueous PEDOT-PSS dispersion, 60 g of water, and 0.135 g of imidazole were mixed, and then a pressure of 100 MPa was applied thereto using a high-pressure dispersion machine (Nanomizer manufactured by Yoshida Kikai Co., Ltd.) to perform a high dispersion treatment. 10 g of a water-dispersible polyester (manufactured by Goo Chemical Co., Ltd., Plascoat RZ-105, solid content concentration: 25% by mass) and 0.5 g of polyvinyl alcohol (manufactured by Kuraray Co., Ltd. Kuraray Poval PVA210, saponification degree: 88%, mass-average molecular weight: 50.000) were added to a first mixed liquid obtained through the high dispersion treatment, and thus a second mixed liquid was obtained.

Using a No. 4 bar coater, an amorphous polyethylene terephthalate film (A-PET film, glass transition temperature: 72° C.) was coated with the second mixed liquid. The coating film obtained through the coating was dried by heating at a temperature of 130° C. and stretched by 2 times in the width direction of the film using a film biaxial stretcher (IMC-11A9 manufactured by Imoto Machinery Co., Ltd.). Accordingly, an antistatic film having an antistatic layer was obtained.

Manufacturing Example 2

An antistatic film was obtained in the same manner as in Manufacturing Example 1, except that the stretching magnification in the width direction of the film was 4.

Manufacturing Example 3

An antistatic film was obtained in the same manner as in Manufacturing Example 1, except that the water-dispersible polyester (Plascoat RZ-105) was changed to a water-dispersible polyester (manufactured by Goo Chemical Co., Ltd., Plascoat Z-880, solid content concentration: 25% by mass).

Manufacturing Example 4

An antistatic film was obtained in the same manner as in Manufacturing Example 1, except that the water-dispersible polyester (Plascoat RZ-105) was changed to a water-dispersible polyester (manufactured by Goo Chemical Co., Ltd., Plascoat Z-565, solid content concentration: 25% by mass).

Manufacturing Example 5

An antistatic film was obtained in the same manner as in Manufacturing Example 1, except that the water-dispersible polyester (Plascoat RZ-105) was changed to a water-dispersible polyester (manufactured by Goo Chemical Co., Ltd., Plascoat Z-690, solid content concentration: 25% by mass).

Manufacturing Example 6

An antistatic film was obtained in the same manner as in Manufacturing Example 1, except that the water-dispersible polyester (Plascoat RZ-105) was changed to a water-dispersible polyester (manufactured by Goo Chemical Co., Ltd., Plascoat Z-3310, solid content concentration: 25% by mass).

Manufacturing Example 7

An antistatic film was obtained in the same manner as in Manufacturing Example 1, except that the water-dispersible polyester (Plascoat RZ-105) was changed to a water-dispersible polyester (manufactured by Goo Chemical Co., Ltd., Plascoat Z-570, solid content concentration: 25% by mass).

Manufacturing Example 8

An antistatic film was obtained in the same manner as in Manufacturing Example 3, except that the amount of the polyvinyl alcohol (manufactured by Kuraray Co., Ltd., Kuraray Poval PVA210) was changed to 0.25 g.

Manufacturing Example 9

An antistatic film was obtained in the same manner as in Manufacturing Example 3, except that the amount of the polyvinyl alcohol (manufactured by Kuraray Co., Ltd., Kuraray Poval PVA210) was changed to 1.0 g.

Manufacturing Example 10

An antistatic film was obtained in the same manner as in Manufacturing Example 3, except that the polyvinyl alcohol (manufactured by Kuraray Co., Ltd., Kuraray Poval PVA210) was changed to polyvinyl alcohol (manufactured by Nippon Synthetic Chemical Industry Co., Ltd., Gohsenol GMI4L, saponification degree: 86.5% to 89.0%, mass-average molecular weight: 1,500).

Manufacturing Example 11

An antistatic film was obtained in the same manner as in Manufacturing Example 3, except that the amount of the aqueous PEDOT-PSS dispersion was changed to 10 g, the amount of water was changed to 80 g. and the amount of imidazole was changed to 0.045 g.

Manufacturing Example 12

The antistatic film obtained in Manufacturing Example 3 was re-heated to 240° C., and then the temperature was gradually lowered to 130° C. to crystallize the amorphous polyethylene terephthalate to thus change the A-PET film into a crystalline PET film.

Manufacturing Example 13

An antistatic film was obtained in the same manner as in Manufacturing Example 1, except that the water-dispersible polyester (manufactured by Goo Chemical Co., Ltd., Plascoat RZ-105) was changed to polyurethane (manufactured by DIC Corporation, Vondic 2210, solid content concentration: 40% by mass).

Manufacturing Example 14

An antistatic film was obtained in the same manner as in Manufacturing Example 1, except that the water-dispersible polyester (manufactured by Goo Chemical Co., Ltd., Plascoat RZ-105) was changed to Vondic 2220 (manufactured by DIC Corporation, polyester polyurethane, solid content concentration: 40% by mass).

Manufacturing Example 15

An antistatic film was obtained in the same manner as in Manufacturing Example 1, except that the water-dispersible polyester (manufactured by Goo Chemical Co., Ltd., Plascoat RZ-105) was changed to Vondic 2260 (manufactured by DIC Corporation, polyurethane, solid content concentration: 40% by mass).

Manufacturing Example 16

An antistatic film was obtained in the same manner as in Manufacturing Example 1, except that the water-dispersible polyester (manufactured by Goo Chemical Co., Ltd., Plascoat RZ-105) was changed to a water-dispersible polyester (manufactured by Goo Chemical Co., Ltd., Plascoat RZ-565, solid content concentration: 25% by mass) and Kuraray Poval PVA210 was changed to Kuraray Poval LM25 (saponification degree: 33.0 to 38.0, mass-average molecular weight: 18,000).

Manufacturing Example 17

An antistatic film was obtained in the same manner as in Manufacturing Example 1, except that the water-dispersible polyester (manufactured by Goo Chemical Co., Ltd., Plascoat RZ-105) was changed to a water-dispersible polyester (manufactured by Goo Chemical Co., Ltd., Plascoat Z-880, solid content concentration: 25% by mass) and Kuraray Poval PVA210 was changed to Kuraray Poval LM25 (saponification degree: 33.0 to 38.0, mass-average molecular weight: 18.000).

Manufacturing Example 18

30 g of the aqueous PEDOT-PSS dispersion, 70 g of water, and 0.135 g of imidazole were mixed, and then a pressure of 100 MPa was applied thereto using a high-pressure dispersion machine (Nanomizer manufactured by Yoshida Kikai Co., Ltd.) to perform a high dispersion treatment. 0.5 g of polyvinyl alcohol (manufactured by Kuraray Co., Ltd., Kuraray Poval PVA210) was added to a first mixed liquid obtained through the high dispersion treatment, and thus a second mixed liquid was obtained.

Using a No. 4 bar coater, an amorphous polyethylene terephthalate film (A-PET film, glass transition temperature: 72° C.) was coated with the second mixed liquid. The coating film obtained through the coating was dried by heating at a temperature of 130° C. and stretched by 2 times in the width direction of the film using a film biaxial stretcher (IMC-11A9 manufactured by Imoto Machinery Co., Ltd.). Accordingly, an antistatic film having an antistatic layer was obtained.

Manufacturing Example 19

A film was obtained in the same manner as in Manufacturing Example 1, except that the polyvinyl alcohol was not added.

Manufacturing Example 20

A film was obtained in the same manner as in Manufacturing Example 2, except that the polyvinyl alcohol was not added.

Manufacturing Example 21

A film was obtained in the same manner as in Manufacturing Example 3, except that the polyvinyl alcohol was not added.

Manufacturing Example 22

A film was obtained in the same manner as in Manufacturing Example 4, except that the polyvinyl alcohol was not added.

Manufacturing Example 23

A film was obtained in the same manner as in Manufacturing Example 5, except that the polyvinyl alcohol was not added.

Manufacturing Example 24

A film was obtained in the same manner as in Manufacturing Example 6, except that the polyvinyl alcohol was not added.

Manufacturing Example 25

A film was obtained in the same manner as in Manufacturing Example 7, except that the polyvinyl alcohol was not added.

Manufacturing Example 26

A film was obtained in the same manner as in Manufacturing Example 8, except that the polyvinyl alcohol was not added.

Manufacturing Example 27

A film was obtained in the same manner as in Manufacturing Example 9, except that the polyvinyl alcohol was not added.

Manufacturing Example 28

A film was obtained in the same manner as in Manufacturing Example 10, except that the polyvinyl alcohol was not added.

Manufacturing Example 29

A film was obtained in the same manner as in Manufacturing Example 11, except that the polyvinyl alcohol was not added.

Manufacturing Example 30

A film was obtained in the same manner as in Manufacturing Example 13, except that the polyvinyl alcohol was not added.

Manufacturing Example 31

A film was obtained in the same manner as in Manufacturing Example 14, except that the polyvinyl alcohol was not added.

Manufacturing Example 32

A film was obtained in the same manner as in Manufacturing Example 15, except that the polyvinyl alcohol was not added.

Manufacturing Example 33

A film was obtained in the same manner as in Manufacturing Example 16, except that the polyvinyl alcohol was not added.

Manufacturing Example 34

A film was obtained in the same manner as in Manufacturing Example 17, except that the polyvinyl alcohol was not added.

Manufacturing Example 35

A film was obtained in the same manner as in Manufacturing Example 18, except that the polyvinyl alcohol was not added.

Manufacturing Example 36

30 g of the aqueous PEDOT-PSS dispersion, 60 g of water, and 0.135 g of imidazole were mixed, and then a pressure of 100 MPa was applied thereto using a high-pressure dispersion machine (Nanomizer manufactured by Yoshida Kikai Co., Ltd.) to perform a high dispersion treatment. 10 g of a water-dispersible polyester (manufactured by Goo Chemical Co., Ltd., Plascoat Z-880, solid content concentration: 25% by mass) and 0.3 g of polyethylene glycol (average molecular weight: 1,000) were added to the obtained liquid to obtain a mixed liquid.

Using a No. 4 bar coater, an amorphous polyethylene terephthalate film (A-PET film, glass transition temperature: 72° C.) was coated with the obtained mixed liquid. The coating film obtained through the coating was dried by heating at a temperature of 130° C. and stretched by 2 times in the width direction of the film using a film biaxial stretcher (IMC-11A9 manufactured by Imoto Machinery Co., Ltd.). Accordingly, an antistatic film having an antistatic layer was obtained.

Evaluation

The surface resistance value of each antistatic film was measured using a resistivity meter (Hiresta manufactured by Mitsubishi Chemical Corporation). The measurement results are shown in Tables 1 and 2. The smaller the surface resistance value, the better the antistatic property. In the tables, "OVER" means that the value exceeds the upper limit of the measurable range.

TABLE 1

| Manufacturing Example No. | Water-Dispersible Resin | pH of Mixed Liquid | Polyvinyl Alcohol | Stretching Magnification (times) | Crystallization | Surface Resistance Value ($\Omega$/) |
|---|---|---|---|---|---|---|
| 1 | Plascoat RZ-105 | 7 | PVA210 (0.5 g) | 2 | None | $2.0 \times 10^7$ |
| 2 | Plascoat RZ-105 | 7 | PVA210 (0.5 g) | 4 | None | $2.0 \times 10^8$ |
| 3 | Plascoat Z-880 | 7 | PVA210 (0.5 g) | 2 | None | $1.0 \times 10^9$ |
| 4 | Plascoat Z-565 | 7 | PVA210 (0.5 g) | 2 | None | $2.0 \times 10^9$ |
| 5 | Plascoat Z-690 | 7 | PVA210 (0.5 g) | 2 | None | $1.0 \times 10^8$ |
| 6 | Plascoat Z-3310 | 7 | PVA210 (0.5 g) | 2 | None | $8.0 \times 10^8$ |
| 7 | Plascoat Z-570 | 7 | PVA210 (0.5 g) | 2 | None | $1.0 \times 10^7$ |
| 8 | Plascoat Z-880 | 7 | PVA210 (0.25 g) | 2 | None | $6.0 \times 10^8$ |

TABLE 1-continued

| Manufacturing Example No. | Water-Dispersible Resin | pH of Mixed Liquid | Polyvinyl Alcohol | Stretching Magnification (times) | Crystallization | Surface Resistance Value (Ω/) |
|---|---|---|---|---|---|---|
| 9  | Plascoat Z-880 | 7 | PVA210 (1.0 g) | 2 | None    | $1.0 \times 10^8$ |
| 10 | Plascoat Z-880 | 7 | GM14L (0.5 g)  | 2 | None    | $5.0 \times 10^7$ |
| 11 | Plascoat Z-880 | 7 | PVA210 (0.5 g) | 2 | None    | $4.0 \times 10^7$ |
| 12 | Plascoat Z-880 | 7 | PVA210 (0.5 g) | 2 | Present | $3.0 \times 10^9$ |
| 13 | Vondic 2210    | 7 | PVA210 (0.5 g) | 2 | None    | $2.0 \times 10^7$ |
| 14 | Vondic 2220    | 7 | PVA210 (0.5 g) | 2 | None    | $5.0 \times 10^7$ |
| 15 | Vondic 2260    | 7 | PVA210 (0.5 g) | 2 | None    | $1.0 \times 10^7$ |
| 16 | Plascoat Z-565 | 7 | LM25 (0.5 g)   | 2 | None    | $4.0 \times 10^7$ |
| 17 | Plascoat Z-880 | 7 | LM25 (0.5 g)   | 2 | None    | $2.0 \times 10^7$ |
| 18 | None           | 7 | PVA210 (0.5 g) | 2 | None    | $4.0 \times 10^6$ |

TABLE 2

| Manufacturing Example No. | Water-Dispersible Resin | pH of Mixed Liquid | Polyvinyl Alcohol | Stretching Magnification (times) | Crystallization | Surface Resistance Value (Ω/) |
|---|---|---|---|---|---|---|
| 19 | Plascoat RZ-105 | 7 | None | 2 | None | OVER |
| 20 | Plascoat RZ-105 | 7 | None | 4 | None | OVER |
| 21 | Plascoat Z-880  | 7 | None | 2 | None | OVER |
| 22 | Plascoat Z-565  | 7 | None | 2 | None | OVER |
| 23 | Plascoat Z-690  | 7 | None | 2 | None | OVER |
| 24 | Plascoat Z-3310 | 7 | None | 2 | None | OVER |
| 25 | Plascoat Z-570  | 7 | None | 2 | None | OVER |
| 26 | Plascoat Z-880  | 7 | None | 2 | None | OVER |
| 27 | Plascoat Z-880  | 7 | None | 2 | None | OVER |
| 28 | Plascoat Z-880  | 7 | None | 2 | None | OVER |
| 29 | Plascoat Z-880  | 7 | None | 2 | None | OVER |
| 30 | Vondic 2210     | 7 | None | 2 | None | OVER |
| 31 | Vondic 2220     | 7 | None | 2 | None | OVER |
| 32 | Vondic 2260     | 7 | None | 2 | None | OVER |
| 33 | Plascoat Z-565  | 7 | None | 2 | None | OVER |
| 34 | Plascoat Z-880  | 7 | None | 2 | None | OVER |
| 35 | None            | 7 | None | 2 | None | OVER |
| 36 | Plascoat Z-880 Polyethylene Glycol | 7 | None | 2 | None | OVER |

In Manufacturing Examples 1 to 18 in which the film base was coated with the mixed liquid containing a polyvinyl alcohol in addition to PEDOT-PSS, the surface resistance values of the antistatic films were sufficiently small, and thus a particularly excellent antistatic property was obtained.

In Manufacturing Examples 19 to 35 in which the film base was coated with the mixed liquid containing PEDOT-PSS but not containing a polyvinyl alcohol, the obtained antistatic film had a low antistatic property. In Manufacturing Examples 19 to 35, the reason for the low antistatic property is thought to be that the stretchability became insufficient since the mixed liquid did not contain the polyvinyl alcohol, and thus defects were generated in the antistatic layer.

In Manufacturing Example 36 in which the film base was coated with the mixed liquid containing polyethylene glycol in place of the polyvinyl alcohol, the obtained antistatic film also had a low antistatic property.

INDUSTRIAL APPLICABILITY

An antistatic film obtained in the invention can be preferably used as electronic component packaging films, food packaging films, and the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of manufacturing an antistatic film, comprising:
    a preparation step of preparing a mixed liquid by mixing a polyvinyl alcohol with an aqueous conductive polymer dispersion in which a conductive composite containing a n-conjugated conductive polymer and a polyanion is included in a water-based dispersion medium, wherein the content ratio of the polyvinyl alcohol in the mixed liquid is 0.01% by mass to 10% by mass;
    a coating step of obtaining a coating film by coating at least one surface of a film base with the mixed liquid, wherein an amorphous polyethylene terephthalate film is used as the film base; and
    a drying and stretching step of forming an antistatic layer by drying and stretching both the coating film and the film base with heating,
    wherein the dried coating film is heated to 200° C. or higher after the drying and stretching step, and then cooled to a crystallization temperature of the polyethylene terephthalate.

2. The method of manufacturing an antistatic film according to claim 1,
wherein a water-dispersible resin is further mixed with the aqueous conductive polymer dispersion.

* * * * *